(12) United States Patent (10) Patent No.: US 8,315,010 B2
Hamakawa et al. (45) Date of Patent: Nov. 20, 2012

(54) SPINDLE MOTOR FOR DISK DRIVE WITH MAGNETIC MEMBER AND YOKE FIXED BY ADHESIVE AGENT

(75) Inventors: Keita Hamakawa, Kyoto (JP); Daisuke Adachi, Kyoto (JP); Takuro Jimbu, Kyoto (JP); Takayuki Iwase, Kyoto (JP)

(73) Assignee: Nidec Corporation, Kyoto (JP)

( * ) Notice: Subject to any disclaimer, the term of this patent is extended or adjusted under 35 U.S.C. 154(b) by 417 days.

(21) Appl. No.: 12/748,620

(22) Filed: Mar. 29, 2010

(65) Prior Publication Data

US 2011/0122529 A1 May 26, 2011

(30) Foreign Application Priority Data

Nov. 25, 2009 (JP) ................................. 2009-267255

(51) Int. Cl.
*G11B 17/08* (2006.01)

(52) U.S. Cl. .................. 360/98.07; 360/97.19

(58) Field of Classification Search ............... 360/97.19, 360/98.01–98.03, 98.07, 99.08
See application file for complete search history.

(56) References Cited

U.S. PATENT DOCUMENTS 6,771,461 B2 8/2004 Parsoneault 8,094,410 B2 * 1/2012 Shirai et al. ................ 360/99.12

FOREIGN PATENT DOCUMENTS

| JP | 07-147050 | 6/1995 |
|---|---|---|
| JP | 08-084459 | 3/1996 |
| JP | 10-225076 | 8/1998 |
| JP | 2006-331558 | 12/2006 |

\* cited by examiner

*Primary Examiner* — Joseph Feild
*Assistant Examiner* — Gustavo Polo
(74) *Attorney, Agent, or Firm* — Keating & Bennett, LLP

(57) ABSTRACT

A hub includes first and second side surfaces respectively opposed to inner and outer circumferential surfaces of an upper portion of a magnetic member, and a ceiling surface arranged to interconnect an upper ends of the first and second side surfaces. The adhesive agent is interposed between the inner circumferential surface of the upper portion of the magnetic member and the first side surface of the hub and between the upper surface of the magnetic member and the ceiling surface of the hub. Radial distance between the inner circumferential surface of the upper portion of the magnetic member and the first side surface of the hub and axial distance between the upper surface of the magnetic member and the ceiling surface of the hub are smaller than radial distance between the outer circumferential surface of the upper portion of the magnetic member and the second side surface of the hub.

14 Claims, 8 Drawing Sheets

SPINDLE MOTOR FOR DISK DRIVE WITH MAGNETIC MEMBER AND YOKE FIXED BY ADHESIVE AGENT

BACKGROUND OF THE INVENTION

1. Field of the Invention

The present invention relates to a spindle motor, a disk drive apparatus and a method for manufacturing the spindle motor.

2. Description of the Related Art

A hard disk drive apparatus or an optical disk drive apparatus is equipped with a spindle motor for rotating a disk about the center axis thereof. The spindle motor includes a housing, a stator unit fixed to the housing and a rotor unit arranged to rotate while supporting a disk. In the spindle motor, torque acting about the center axis is generated by the magnetic flux flowing between the stator unit and the rotor unit, whereby the rotor unit is rotated with respect to the stator unit.

A spindle motor including a stator assembly, a hub, a back iron and a magnet is disclosed in, e.g., U.S. Pat. No. 6,771,461. With the spindle motor disclosed in the '461 patent, only the upper portion of the inner circumferential surface of the back iron is fixed to the hub by an adhesive agent. However, the bonding area is small in this configuration, which makes it difficult to securely fix the back iron to the hub.

SUMMARY OF THE INVENTION

A first preferred embodiment of the present invention is directed to a spindle motor including a stationary unit and a rotary unit supported for rotation with respect to the stationary unit. The rotary unit includes a hub and a substantially cylindrical magnetic member. The hub is provided with a circular flat portion extending radially with respect to a vertically-extending center axis and having an upwardly-indented annular groove portion formed on the lower surface thereof and a cylinder portion extending downwards from an outer edge of the circular flat portion. The magnetic member has an upper portion fixed to the annular groove portion by an adhesive agent. The hub includes a first side surface opposed to an inner circumferential surface of the upper portion of the magnetic member, a second side surface opposed to an outer circumferential surface of the upper portion of the magnetic member and a ceiling surface arranged to interconnect an upper end of the first side surface and an upper end of the second side surface. The adhesive agent applied in an uncured state during a motor manufacturing process is interposed between the inner circumferential surface of the upper portion of the magnetic member and the first side surface of the hub and between the upper surface of the magnetic member and the ceiling surface of the hub. The radial distance between the inner circumferential surface of the upper portion of the magnetic member and the first side surface of the hub and the axial distance between the upper surface of the magnetic member and the ceiling surface of the hub are smaller than the radial distance between the outer circumferential surface of the upper portion of the magnetic member and the second side surface of the hub.

With the preferred embodiment of the present invention, the capillary forces acting between the inner circumferential surface of the upper portion of the magnetic member and the first side surface of the hub and between the upper surface of the magnetic member and the ceiling surface of the hub when the adhesive agent is not cured, are greater than the capillary force acting between the outer circumferential surface of the upper portion of the magnetic member and the second side surface of the hub. For that reason, the adhesive agent in an uncured state is readily held between the inner circumferential surface of the upper portion of the magnetic member and the first side surface of the hub and between the upper surface of the magnetic member and the ceiling surface of the hub. Consequently, the magnetic member is securely fixed to the first side surface and the ceiling surface of the hub.

A second preferred embodiment of the present invention is directed to a method for manufacturing a spindle motor including a stationary unit and a rotary unit supported for rotation with respect to the stationary unit. The rotary unit includes a hub and a substantially cylindrical magnetic member. The hub is provided with a circular flat portion extending radially with respect to a vertically-extending center axis and having an upwardly-indented annular groove portion formed on the lower surface thereof and a cylinder portion extending downwards from an outer edge of the circular flat portion. The magnetic member has an upper portion fixed to the annular groove portion by an adhesive agent. The hub includes a first side surface opposed to an inner circumferential surface of the upper portion of the magnetic member, a second side surface opposed to an outer circumferential surface of the upper portion of the magnetic member and a ceiling surface arranged to interconnect an upper end of the first side surface and an upper end of the second side surface. The method includes the steps of: a) forming a third side surface on the inner circumferential surface of the cylinder portion of the hub, the third side surface being positioned below the second side surface and having an inner diameter greater than the inner diameter of the second side surface; b), after the step a), simultaneously finish-processing the first side surface, the second side surface and the ceiling surface with a first cutting tool; and c), after the step b), arranging the magnetic member so that the radial distance between the inner circumferential surface of th upper portion of the magnetic member and the first side surface of the hub and the axial distance between the upper surface of the magnetic member and the ceiling surface of the hub become smaller than the radial distance between the outer circumferential surface of the upper portion of the magnetic member and the second side surface of the hub, and fixing the upper portion of the magnetic member to the first side surface and the ceiling surface of the hub with an adhesive agent.

With the preferred embodiment of the present invention, it is possible in the step b) to cut the second side surface without cutting the third side surface. This helps reduce wear of the cutting tool. In the step c), the capillary forces acting between the inner circumferential surface of the upper portion of the magnetic member and the first side surface of the hub and between the upper surface of the magnetic member and the ceiling surface of the hub are greater than the capillary force acting between the outer circumferential surface of the upper portion of the magnetic member and the second side surface of the hub. For that reason, the adhesive agent is readily held between the inner circumferential surface of the upper portion of the magnetic member and the first side surface of the hub and between the upper surface of the magnetic member and the ceiling surface of the hub. Consequently, the magnetic member is securely fixed to the first side surface and the ceiling surface of the hub.

Other features, elements, steps, characteristics and advantages of the present invention will become more apparent from the following detailed description of preferred embodiments of the present invention with reference to the attached drawings.

DETAILED DESCRIPTION OF THE INVENTION

Preferred embodiments of the present invention will now be described with reference to the accompanying drawings. In the following description, the direction running along a center axis 9 will be referred to as a vertical direction and the direction in which a cylinder portion extends from the outer edge portion of a circular flat portion of a hub will be referred to as "lower" or "downwards". The shape and positional relationship of the respective members will be described based on these definitions. These definitions are presented merely for the convenience in description and are not intended to limit the in-use postures of a bearing unit, a spindle motor and a disk drive apparatus of the present invention.

Figure 1:
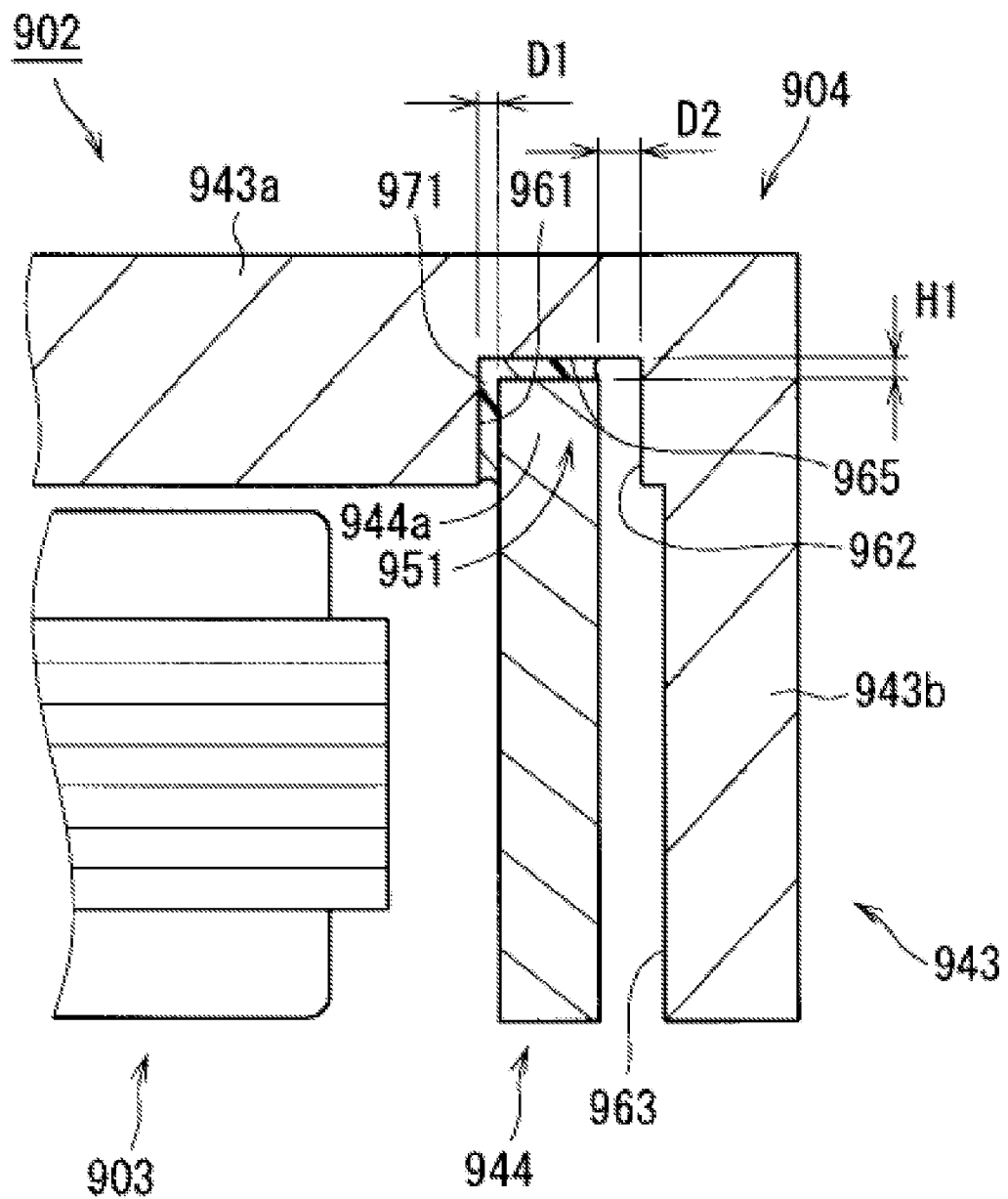
FIG. 1 is a partially-enlarged vertical section view showing a spindle motor in accordance with one preferred embodiment of the present invention.

FIG. 1 is a partially-enlarged vertical section view of a spindle motor 902 in accordance with a preferred embodiment of the present invention. Referring to FIG. 1, the spindle motor 902 preferably includes a stator unit 903 and a rotor unit 904. The rotor unit 904 is supported for rotation with respect to the stator unit 903.

The rotor unit 904 preferably includes a hub 943 and a magnetic member 944. The hub 943 preferably includes a circular flat portion 943a and a cylinder portion 943b. The circular flat portion 943a extends radially away from a vertically-extending center axis. An annular groove portion 951 indented upwards is defined on the lower surface of the circular flat portion 943a. The cylinder portion 943b extends downwards from the outer edge portion of the circular flat portion 943a.

The magnetic member 944 has a substantially cylindrical shape. The upper portion 944a of the magnetic member 944 is fixed to the annular groove portion 951 of the hub 943 by an adhesive agent 971.

The hub 943 includes a first side surface 961, a second side surface 962 and a ceiling surface 965, which are opposed to the upper portion 944a of the magnetic member 944. The first side surface 961 is opposed to the inner circumferential surface of the upper portion 944a of the magnetic member 944. The second side surface 962 is opposed to the outer circumferential surface of the upper portion 944a of the magnetic member 944. The ceiling surface 965 is formed to interconnect the upper end of the first side surface 961 and the upper end of the second side surface 962.

The adhesive agent 971 is applied in a liquid phase during a motor manufacturing process. The adhesive agent 971 is situated between the inner circumferential surface of the upper portion 944a of the magnetic member 944 and the first side surface 961 of the hub 943 and between the upper surface of the magnetic member 944 and the ceiling surface 965 of the hub 943. Preferably, the radial distance D1 between the inner circumferential surface of the upper portion 944a of the magnetic member 944 and the first side surface 961 of the hub 943 and the axial distance H1 between the upper surface of the magnetic member 944 and the ceiling surface 965 of the hub 943 are smaller than the radial distance D2 between the outer circumferential surface of the upper portion 944a of the magnetic member 944 and the second side surface 962 of the hub 943.

Prior to the adhesive agent 971 being cured, therefore, the capillary forces acting between the inner circumferential surface of the upper portion 944a of the magnetic member 944 and the first side surface 961 of the hub 943 and between the upper surface of the magnetic member 944 and the ceiling surface 965 of the hub 943 are greater than the capillary force acting between the outer circumferential surface of the upper portion 944a of the magnetic member 944 and the second side surface 962 of the hub 943. For that reason, the adhesive agent 971 in an uncured state is readily held between the inner circumferential surface of the upper portion 944a of the magnetic member 944 and the first side surface 961 of the hub 943 and between the upper surface of the magnetic member 944 and the ceiling surface 965 of the hub 943. Consequently, the magnetic member 944 is securely fixed to the first side surface 961 and the ceiling surface 965 of the hub 943.

In the manufacturing process of the spindle motor 902, a third side surface 963 positioned below the second side surface 962 is first formed on the inner circumferential surface of the cylinder portion 943b of the hub 943. Preferably, the inner diameter of the third side surface 963 is greater than that of the second side surface 962.

Then, the first side surface 961, the second side surface 962 and the ceiling surface 965 of the hub 943 are simultaneously finished by a cutting tool. In this regard, the second side surface 962 is cut without having to cut the third side surface 963. This helps reduce wear of the cutting tool.

Thereafter, the magnetic member 944 is arranged within the hub 943 so that the radial distance D1 and the axial distance H1 can become smaller than the radial distance D2. D1 signifies the radial distance between the inner circumferential surface of the upper portion 944a of the magnetic member 944 and the first side surface 961 of the hub 943. H1 denotes the axial distance between the upper surface of the magnetic member 944 and the ceiling surface 965 of the hub 943. D2 indicates the radial distance between the outer circumferential surface of the upper portion 944a of the magnetic member 944 and the second side surface 962 of the hub 943. Subsequently, the upper portion 944a of the magnetic member 944 is fixed to the first side surface 961 and the ceiling surface 965 of the hub 943 by the adhesive agent 971.

Next, description will be made on a specific preferred embodiment of the present invention.

Figure 2:
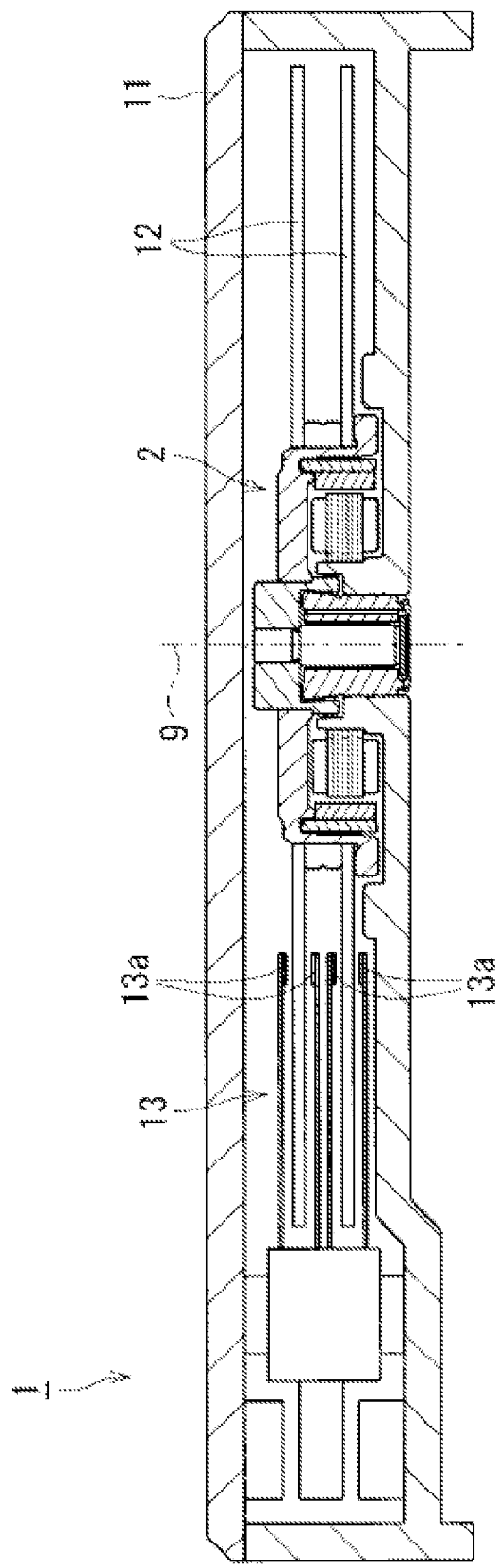
FIG. 2 is a vertical section view showing a disk drive apparatus.

FIG. 2 is a vertical section view showing a disk drive apparatus 1. The disk drive apparatus 1 performs a task of reading information from, e.g., a magnetic disk 12 (hereinafter simply referred to as "disk 12"), and a task of writing information on the disk 12, while rotating the disk 12. As shown in FIG. 2, the disk drive apparatus 1 preferably includes an apparatus housing 11, two disks 12, an access unit 13 and a spindle motor 2.

The apparatus housing 11 accommodates therein the disks 12, the access unit 13 and the spindle motor 2. The access unit 13 preferably includes heads 13a and performs the tasks of reading and writing information with respect to the disks 12, while moving the heads 13a across the recording surfaces of the disks 12 supported on the spindle motor 2. The access unit 13 may perform only one of the tasks of reading and writing information with respect to the disks 12.

Figure 3:
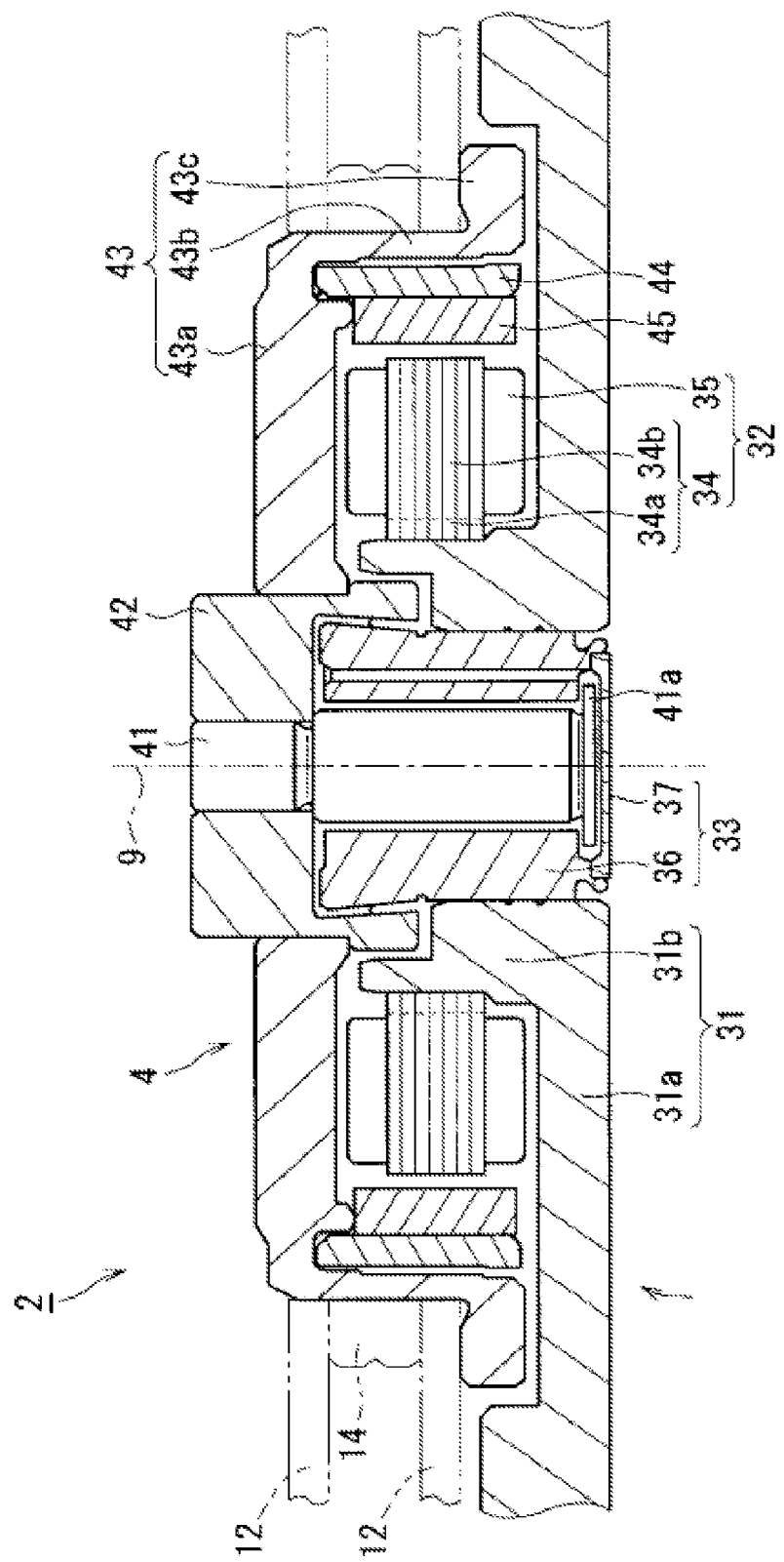
FIG. 3 is a vertical section view of the spindle motor.

Next, description will be made on the configuration of the spindle motor 2. FIG. 3 is a vertical section view of the spindle motor 2. As shown in FIG. 3, the spindle motor 2 preferably includes a stationary unit 3 and a rotary unit 4.

The stationary unit 3 preferably includes a base member 31, a stator unit 32 and a stationary bearing unit 33.

The base member 31 includes a portion of the apparatus housing 11 of the disk drive apparatus 1 (see FIG. 2) and is integrally formed with other portions of the apparatus housing 11 as a single unit. Alternatively, the base member 31 and the apparatus housing 11 may be formed independently of one another. The base member 31 preferably includes a flat portion 31a extending in a radial direction (namely, the direction perpendicular to a center axis 9) and a substantially cylindrical holder portion 31b protruding upwards from the inner edge of the flat portion 31a. The base member 31 is made of metal, e.g., aluminum or the like.

The stator unit 32 preferably includes a stator core 34 and coils 35. The stator unit 32 generates magnetic flux as a drive current is applied to the coils 35. The stator core 34 preferably includes an annular core-back 34a and a plurality of teeth 34b protruding radially outwards from the core-back 34a. The core-back 34a is fixed to the outer circumferential surface of the holder portion 31b of the base member 31. The stator core 34 is formed by, e.g., laminating electromagnetic steel plates in an axial direction (namely, the direction running along the center axis 9). The coils 35 are formed of conductive wires wound around the respective teeth 34b of the stator core 34.

The stationary bearing unit 33 supports a shaft 41 of the rotary unit 4 in a rotatable manner. The stationary bearing unit 33 preferably includes a sleeve 36 and a cap 37. Preferably, the sleeve 36 has a substantially cylindrical shape and is fixed to the inner circumferential surface of the holder portion 31b of the base member 31. The cap 37 serves to close the lower opening of the sleeve 36. The inner circumferential surface of the sleeve 36 is radially opposed to the outer circumferential surface of the shaft 41. Lubricating oil is filled in a gap between the inner circumferential surface of the sleeve 36 and the outer circumferential surface of the shaft 41.

The rotary unit 4 preferably includes the shaft 41, a bushing 42, a hub 43, a yoke 44 and a rotor magnet 45. The shaft 41 has a substantially cylindrical columnar shape and extends vertically along the center axis 9. The shaft 41 is inserted into the sleeve 36 and supported by the stationary bearing unit 33 for rotation with respect thereto. An annular flange portion 41a is formed in the lower end portion of the shaft 41. The flange portion 41a is positioned between the lower surface of the sleeve 36 and the upper surface of the cap 37. The flange portion 41a serves to prevent the shaft 41 from being removed out of the sleeve 36. Alternatively, the flange portion 41a may be provided independently of the shaft 41.

The bushing 42 is fixed to the upper end portion of the shaft 41. In the present preferred embodiment, the bushing 42 is preferably made of stainless steel with increased hardness. Thus, the bushing 42 is securely fixed to the shaft 41. Alternatively, the shaft 41 and the bushing 42 may be formed of a single member.

The hub 43 is fixed to the bushing 42 and rotated together with the shaft 41 and the bushing 42. The hub 43 preferably includes a circular flat portion 43a, a cylinder portion 43b and a flange portion 43c. The circular flat portion 43a preferably includes a portion fixed to the bushing 42 and extending radially outwards. The cylinder portion 43b preferably includes a portion extending downwards from the outer edge of the circular flat portion 43a. The flange portion 43c preferably includes a portion protruding radially outwards from the lower end of the cylinder portion 43b.

The outer circumferential surface of the cylinder portion 43b preferably includes a contact surface arranged to make contact with the inner circumferential portions of, the disks 12. The upper surface of the flange portion 43c preferably includes a disk support surface arranged to support the lower disk 12. The lower disk 12 is placed on the upper surface of the flange portion 43c. The upper disk 12 is placed on the lower disk 12 with a spacer 14 interposed therebetween. In this manner, the cylinder portion 43b and the flange portion 43c cooperate to provide a holder unit that holds the two disks 12 in place.

In the present preferred embodiment, the disks 12 are preferably made of aluminum alloy. So is the hub 43. This means that the linear expansion coefficient of the disks 12 is equal to or approximate to that of the hub 43. Therefore, it is possible to reduce the stress which would be generated between the disks 12 and hub 43 due to a temperature change.

The yoke 44 and the rotor magnet 45 are magnetic members arranged at the side of the rotary unit 4. Preferably, the yoke 44 is fixed to the hub 43 by an adhesive agent. It is also preferable that the rotor magnet 45 is fixed to the yoke 44 by an adhesive agent. Preferably, the yoke 44 and the rotor magnet 45 have a substantially cylindrical shape coaxial with the center axis 9. The inner circumferential surface of the rotor magnet 45 is radially opposed to the outer circumferential surface of the teeth 34b of the stator core 34. In addition, the inner circumferential surface of the rotor magnet 45 serves as a magnetic pole surface along which N-poles and S-poles are arranged in an alternating manner. In the present preferred embodiment, the rotor magnet 45 is fixed to the hub 43 through the yoke 44 as a magnetic member. This helps increase the directivity of the magnetic flux generated from the rotor magnet 45. As set forth above, it is preferable in the present preferred embodiment that the cylinder portion 43b, the yoke 44 and the rotor magnet 45 have a radially overlapping structure.

With the spindle motor 2 described above, radial magnetic flux is generated in the teeth 34b of the stator core 34 if a drive current is applied to the coils 35 of the stationary unit 3. The magnetic flux acting between the teeth 34b and the rotor magnet 45 generates circumferential torque, thereby rotating the rotary unit 4 with respect to the stationary unit 3. The disks 12 held in the hub 43 are rotated together with the rotary unit 4.

Figure 4:
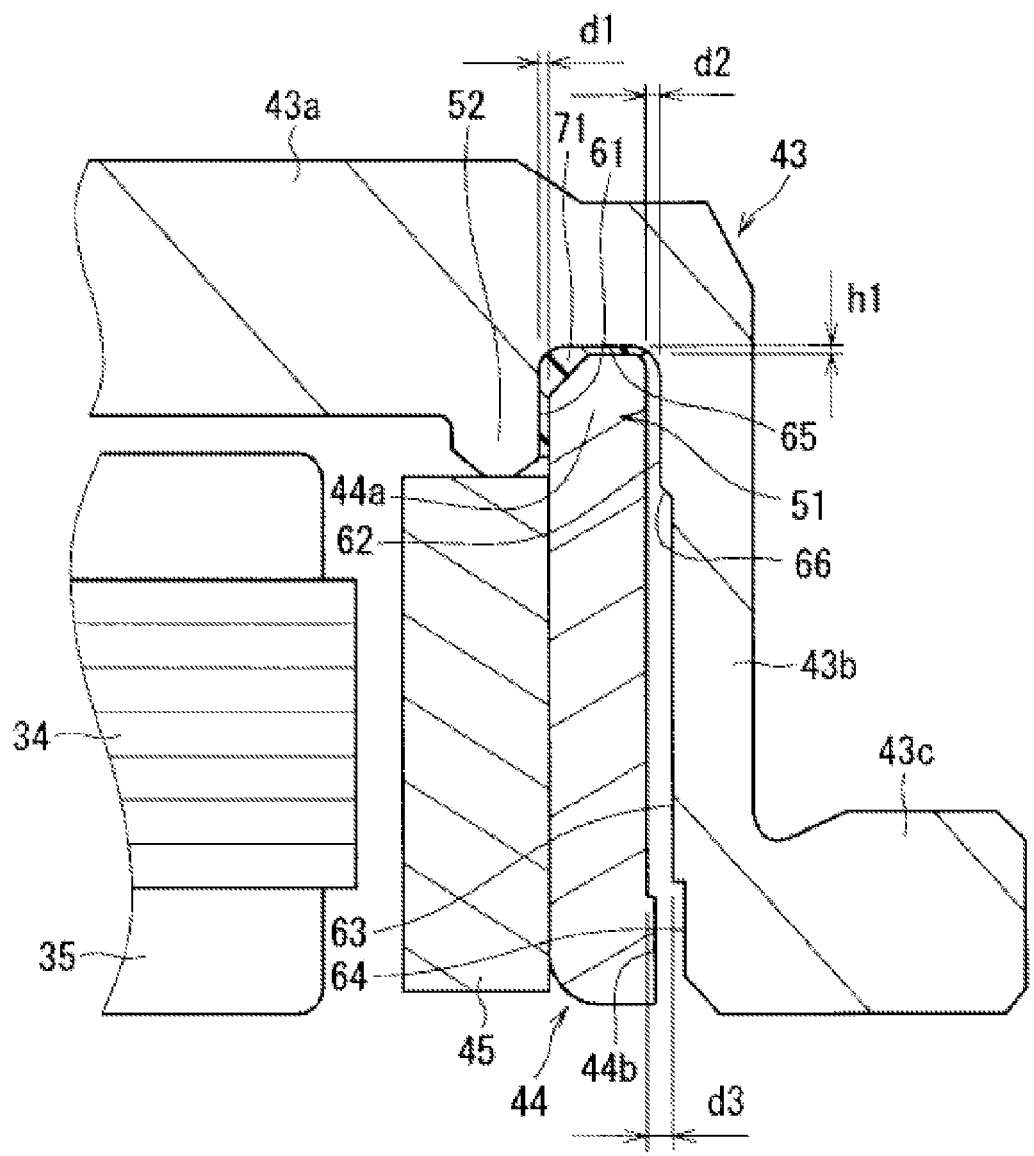
FIG. 4 is an enlarged vertical section view illustrating a yoke and its vicinities.
Figure 5:
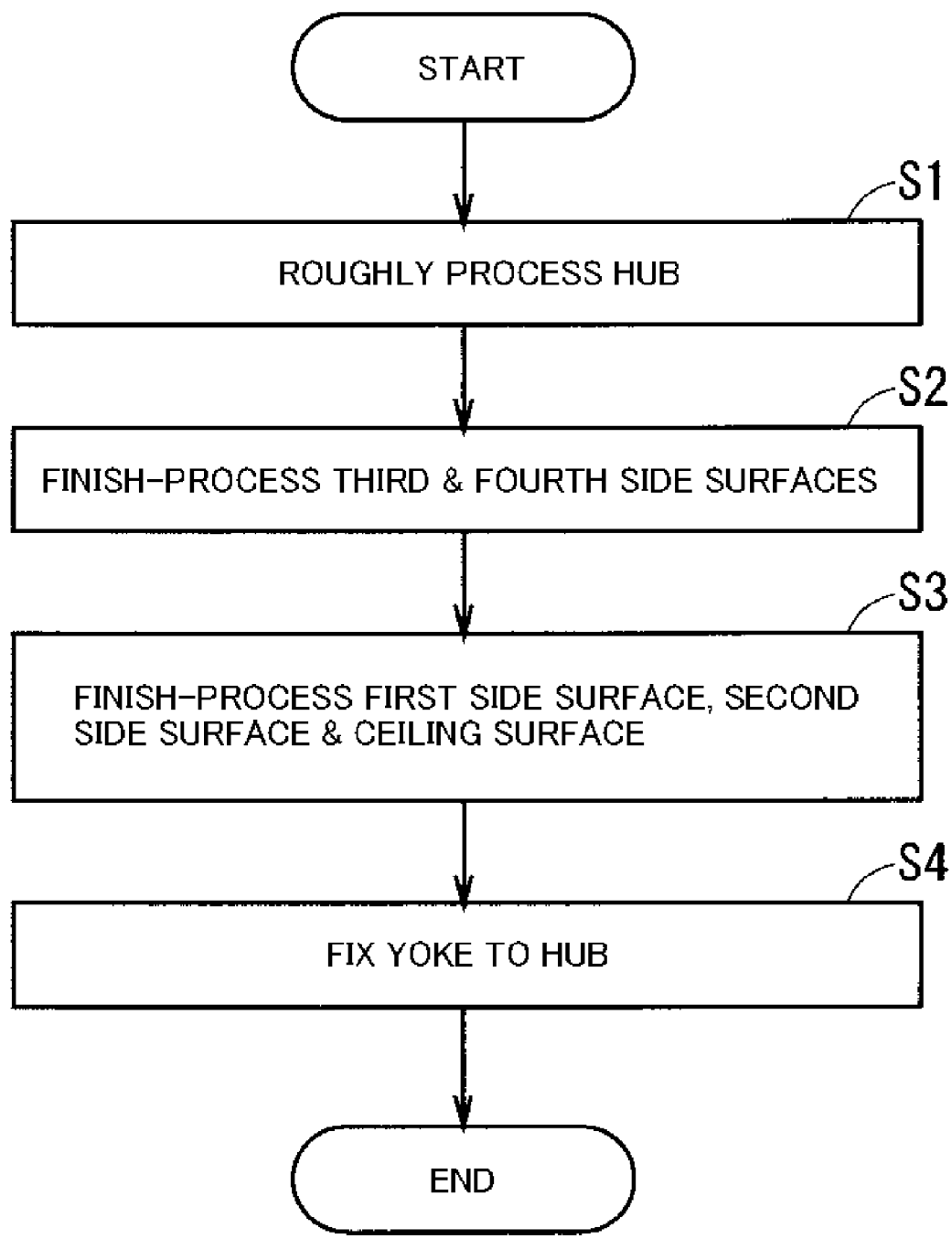
FIG. 5 is a flowchart illustrating the steps of cutting a hub and fixing a yoke.

Next, description will be made on the yoke 44 and its vicinities. FIG. 4 is an enlarged vertical section view showing the yoke 44 and its vicinities.

As shown in FIG. 4, an annular groove portion 51 and an annular jut portion 52 are formed on the lower surface of the circular flat portion 43a. Preferably, the annular groove portion 51 is arranged in the outer circumferential portion of the lower surface of the circular flat portion 43a. The annular groove portion 51 preferably has a circular ring shape. The annular groove portion 51 is preferably indented upwards from the lower surface of the circular flat portion 43a. The annular jut portion 52 preferably has a circular ring shape. The annular jut portion 52 is preferably arranged radially inwards of the annular groove portion 51. The annular jut portion 52 preferably protrudes downwards from the lower surface of the circular flat portion 43a. The annular groove portion 51 and the annular jut portion 52 are radially adjacent to each other. Thus, the radial inner surface of the annular groove portion 51 and the outer circumferential surface of the annular jut portion 52 jointly define a first side surface 61.

The inner circumferential surface of the cylinder portion 43b of the hub 43 preferably includes a second side surface 62, a third side surface 63 and a fourth side surface 64. The second side surface 62 defines the radial outer surface of the annular groove portion 51. The third side surface 63 is positioned below the second side surface 62. The inner diameter of the third side surface 63 is greater than the inner diameter of the second side surface 62. The fourth side surface 64 is positioned below the third side surface 63. The inner diameter of the fourth side surface 64 is greater than the inner diameter of the third side surface 63. In other words, the cylinder portion 43b of the hub 43 includes an inner circumferential surface whose inner diameter is increased downwards step by step.

The hub 43 includes a ceiling surface 65 interconnecting the upper end of the first side surface 61 and the upper end of the second side surface 62. Preferably, the annular groove portion 51 is defined by the first side surface 61, the second side surface 62 and the ceiling surface 65.

The upper portion 44a of the yoke 44 is accommodated within the annular groove portion 51. Therefore, the inner circumferential surface, the outer circumferential surface and the upper surface of the upper portion 44a of the yoke 44 are opposed to the first side surface 61, the second side surface 62 and the ceiling surface 65 of the hub 43, respectively. An adhesive agent 71 is continuously interposed between the inner circumferential surface of the upper portion 44a of the yoke 44 and the first side surface 61 of the hub 43 and between the upper surface of the yoke 44 and the ceiling surface 65 of the hub 43. In other words, the upper portion 44a of the yoke 44 is fixed to the first side surface 61 and the ceiling surface 65 of the hub 43 by the adhesive agent 71. During the motor manufacturing process, the adhesive agent 71 is applied in a liquid phase and then allowed to cure.

In this manner, the yoke 44 is fixed to the two surfaces, i.e., the first side surface 61 and the ceiling surface 65, of the hub 43 by the adhesive agent 71. As a result, the yoke 44 is securely fixed to the hub 43. The radial and axial positions of the yoke 44 are determined by the first side surface 61 and the ceiling surface 65 of the hub 43. Therefore, it is possible to accurately determine the radial and axial positions of the yoke 44 relative to the hub 43.

In the present preferred embodiment, the outer circumferential surface of the upper portion 44a of the yoke 44 is radially opposed to the second side surface 62 of the hub 43 with a gap left therebetween. As shown in FIG. 4, the radial distance d1 between the inner circumferential surface of the upper portion 44a of the yoke 44 and the first side surface 61 of the hub 43 and the axial distance h1 between the upper surface of the yoke 44 and the ceiling surface 65 of the hub 43 are smaller than the radial distance d2 between the outer circumferential surface of the upper portion 44a of the yoke 44 and the second side surface 62 of the hub 43.

Prior to the adhesive agent 71 being cured, therefore, the capillary forces acting between the inner circumferential surface of the upper portion 44a of the yoke 44 and the first side surface 61 of the hub 43 and between the upper surface of the yoke 44 and the ceiling surface 65 of the hub 43 are greater than the capillary force acting between the outer circumferential surface of the upper portion 44a of the yoke 44 and the second side surface 62 of the hub 43. For that reason, the adhesive agent 71 in an uncured state is readily held between the inner circumferential surface of the upper portion 44a of the yoke 44 and the first side surface 61 of the hub 43 and between the upper surface of the yoke 44 and the ceiling surface 65 of the hub 43. Consequently, the yoke 44 is securely fixed to the first side surface 61 and the ceiling surface 65 of the hub 43 by the adhesive agent 71.

Due to the capillary phenomenon, the adhesive agent 71 in an uncured state is hard to flow into the gap between the outer circumferential surface of the upper portion 44a of the yoke 44 and the second side surface 62 of the hub 43. This makes it possible to maintain the accuracy of the cylinder portion 43b, thereby suppressing distortion of the cylinder portion 43b.

In the present preferred embodiment, the third side surface 63 having an inner diameter greater than that of the second side surface 62 is arranged below the second side surface 62. The axial distance d3 between the outer circumferential surface of the yoke 44 and the third side surface 63 of the hub 43 is greater than the axial distance d2 between the outer circumferential surface of the upper portion 44a of the yoke 44 and the second side surface 62 of the hub 43. Therefore, even if the adhesive agent 71 in an uncured state comes into the gap between the upper portion 44a of the yoke 44 and the second side surface 62 and flows up to the border between the second side surface 62 and the third side surface 63, it has a tendency to stay between the outer circumferential surface of the upper portion 44a of the yoke 44 and the second side surface 62 under the capillary phenomenon. Consequently, the adhesive agent 71 is restrained from flowing into between the outer circumferential surface of the yoke 44 and the third side surface 63 of the hub 43.

In the present preferred embodiment, a step portion 66 is arranged between the second side surface 62 and the third side surface 63. The capillary force acting on the adhesive agent 71 in an uncured state is sharply changed in the step portion 66. This further restrains the adhesive agent 71 from flowing into between the outer circumferential surface of the yoke 44 and the third side surface 63 of the hub 43.

In the present preferred embodiment, the surface roughness of the third side surface 63 is greater than that of the second side surface 62. This also helps restrain the adhesive agent 71 from flowing from the gap between the outer circumferential surface of the yoke 44 and the second side surface 62 of the hub 43 toward the gap between the outer circumferential surface of the yoke 44 and the third side surface 63 of the hub 43.

The arithmetic average roughness Ra stipulated in B0601: 2001 of JIS (corresponding to 4287:1997 of ISO) is employed as the surface roughness of the second side surface 62 and the third side surface 63. In measuring the surface roughness, use is made of a stylus-type surface roughness measuring instrument defined in B0651:2001 of JIS (corresponding to 3274: 1996 of ISO). The direction of measurement is perpendicular to the cutting traces. The surface roughness obtained by other measurement methods cannot be used for the purpose of specifying the configuration of the present invention. The stylus-type surface roughness measuring instrument may be calibrated using the standard specimen defined in B0659-1 of JIS.

Preferably, the cylinder portion 43b of the hub 43 is joined to the circular flat portion 43a at its upper end. This means that the cylinder portion 43b of the hub 43 is apt to be distorted in its extension closer to the lower end, i.e., the free end thereof. However, the cylinder portion 43b is relatively hard to be distorted in its extension closer to the upper end thereof, which has the same elevation as the second side surface 62. In the present preferred embodiment, the radial thickness of the cylinder portion 43b at an elevation corresponding to the second side surface 62 is greater than the radial thickness of the cylinder portion 43b at an elevation corresponding to the third side surface 63.

Therefore, even if the adhesive agent 71 is infiltrated into the gap between the outer circumferential surface of the upper portion 44a of the yoke 44 and the second side surface 62 of the hub 43, distortion is hard to occur in the cylinder portion 43b. As set forth above, the upper extension of the cylinder portion 43b of the hub 43 has a great enough radial thickness. This makes it possible to suppress not only the distortion of the cylinder portion 43b attributable to the adhesive agent 71 but also the distortion of the cylinder portion 43b attributable to the stress generated when attaching the disks 12 to the hub 43.

In the present preferred embodiment, the axial length of the second side surface 62 is preferably greater than the axial length of the first side surface 61 as can be seen in FIG. 4. In other words, the lower end of the second side surface 62 is positioned at a lower elevation than the lower end of the first side surface 61. Thus, the cylinder portion 43b has a great enough radial thickness over a broader extent of the upper extension thereof.

In the present preferred embodiment, the yoke 44 is produced through a press-forming process. Use of the press-forming process makes it possible to produce the yoke 44 in a cost-effective manner. However, it is sometimes the case that, as shown in FIG. 4, a press-forming fracture mark in the form of a radially outwardly protruding bulge portion 44b is formed in the lower end portion of the yoke 44. The hub 43 of the present preferred embodiment is provided with the fourth side surface 64 positioned lower than the third side surface 63 and having an inner diameter greater than that of the third side surface 63. In addition, the outer circumferential surface of the bulge portion 44b and the fourth side surface 64 of the hub 43 are opposed to each other with a gap left therebetween. This helps restrain the bulge portion 44b of the yoke 44 from making contact with the cylinder portion 43b of the hub 43.

Next, a process of cutting the hub 43 and fixing the hub 43 to the yoke 44 will be described with reference to FIGS. 5, 6, 7 and 8. A series of steps to be described below is performed as a part of the process for manufacturing the spindle motor 2.

In the cutting process, the hub 43 is first roughly processed as a whole (Step S1). This creates a rough shape of the hub 43.

Figure 6:
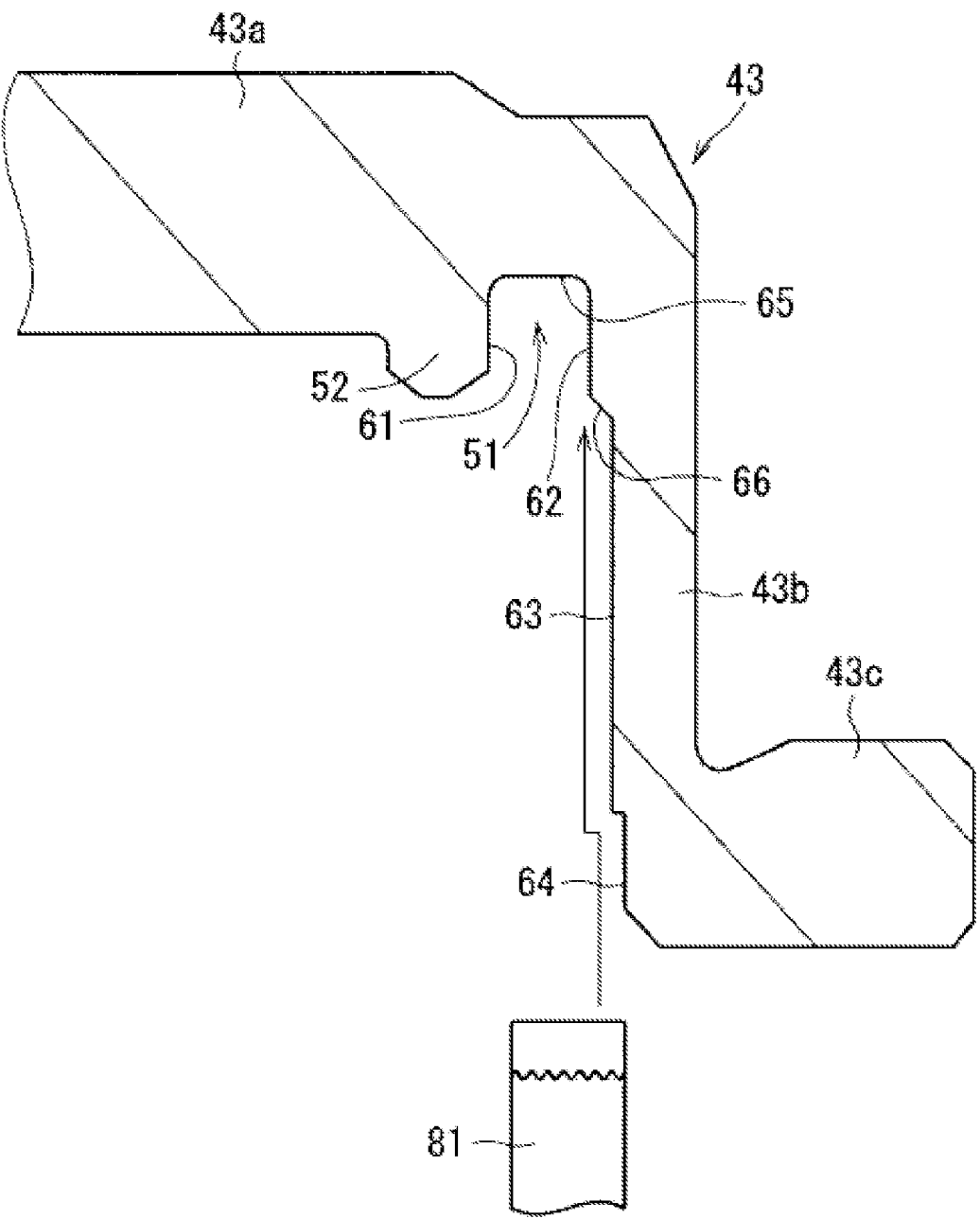
FIG. 6 is a view illustrating how to finish a third side surface and a fourth side surface.

Then, the third side surface 63 and the fourth side surface 64 of the hub 43 are subjected to finish processing (Step S2 and FIG. 6). In this step, the third side surface 63 and the fourth side surface 64 are cut by moving a first cutting tool 81 within the cylinder portion 43b while rotating the hub 43 about the center axis 9. As the first cutting tool 81, use is made of a cutting tool whose processing accuracy is lower than that of the second cutting tool 82 to be described later. This helps reduce the cost involved in finish-processing the third side surface 63 and the fourth side surface 64.

Figure 7:
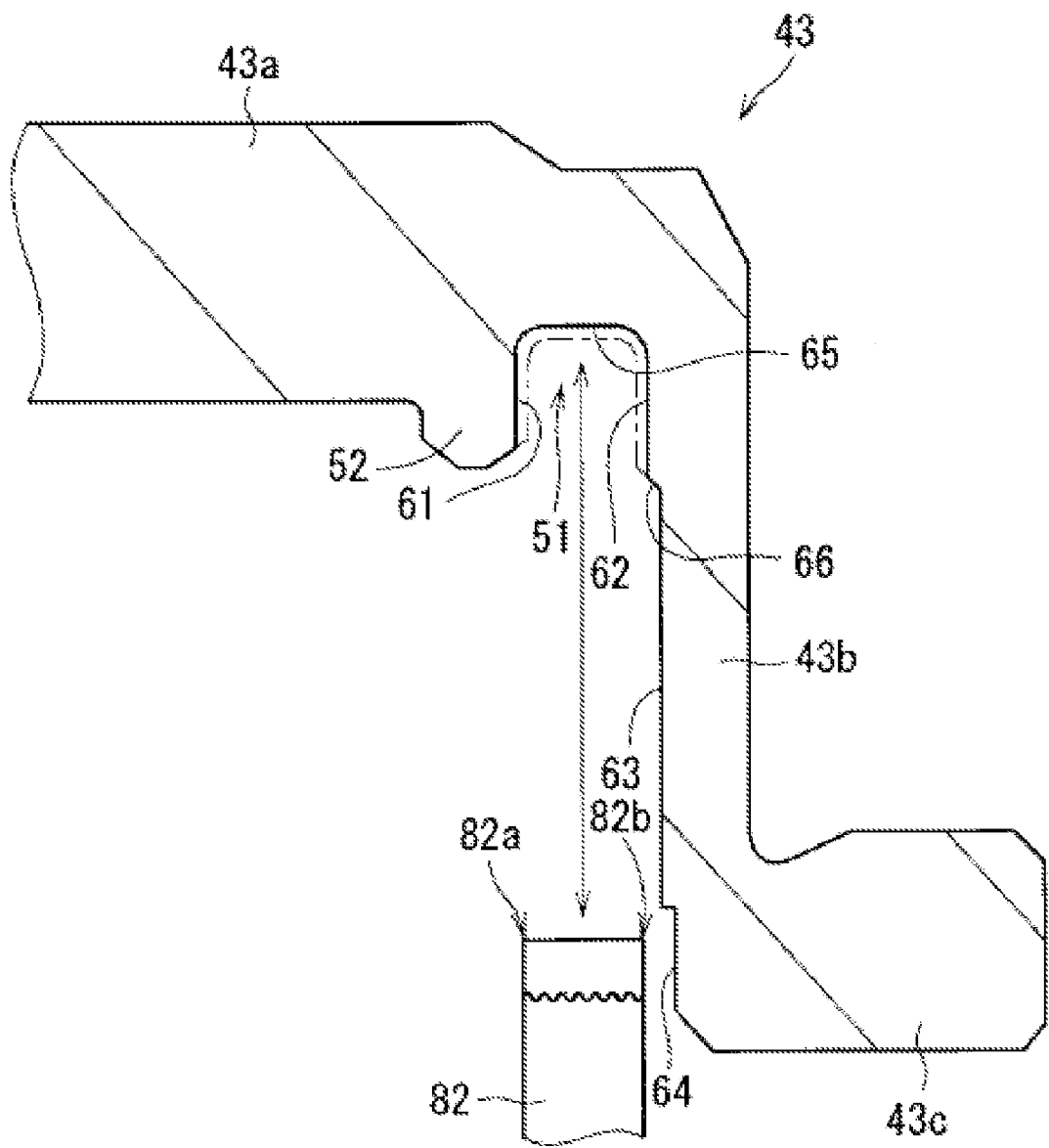
FIG. 7 is a view illustrating how to finish a first side surface, a second side surface and an upper surface.

Subsequently, the first side surface 61, the second side surface 62 and the ceiling surface 65 of the hub 43 are subjected to finish processing (Step S3 and FIG. 7). In this step, a second cutting tool 82 as a cut-off tool is brought into the annular groove portion 51 while rotating the hub 43 about the center axis 9. The first side surface 61, the second side surface 62 and the ceiling surface 65 are simultaneously cut by, e.g., advancing and retracting the second cutting tool 82 once. As the second cutting tool 82, use is made of a cutting tool whose processing accuracy is higher than that of the first cutting tool 81.

In the present preferred embodiment, the step portion 66 is arranged between the second side surface 62 and the third side surface 63. In Step S3, therefore, it is possible to cut the second side surface 62 without cutting the third side surface 63 and the fourth side surface 64. This helps reduce wear of the radial outer edge 82b of the second cutting tool 82. As a result, it is possible to suppress occurrence of a difference in the degree of wear between the radial inner edge 82a and the radial outer edge 82b of the second cutting tool 82.

Preferably, the first side surface 61 and the ceiling surface 65 of the hub 43 are used as reference surfaces for determining the radial and axial positions of the yoke 44. For that reason, the first side surface 61 and the ceiling surface 65 are required to have exceptionally high dimensional accuracy. The second side surface 62 of the hub 43 becomes the radial inner surface of the upper portion of the cylinder portion 43b that needs to have a great enough radial thickness. Therefore, the second side surface 62 is also required to have exceptionally high dimensional accuracy. In Step S3, the second cutting tool 82 exhibiting increased processing accuracy is used in the finish processing of the first side surface 61, the second side surface 62 and the ceiling surface 65. As a result, the first side surface 61, the second side surface 62 and the ceiling surface 65 are processed with increased accuracy.

Figure 8:
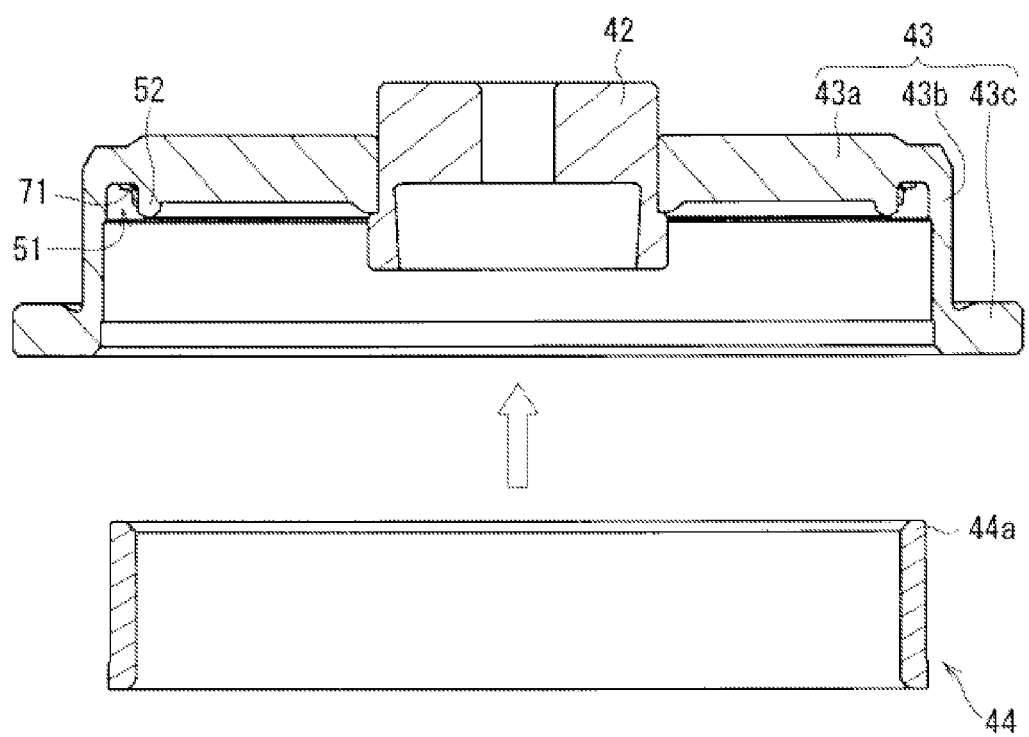
FIG. 8 is a view illustrating how to fix a hub and a yoke together.

The yoke 44 is fixed to the first side surface 61 and the ceiling surface 65 of the hub 43 by the adhesive agent (Step S4 and FIG. 8). First, the adhesive agent 71 in an uncured state is applied on the first side surface 61 and the ceiling surface 65 of the hub 43. Then, the upper portion 44a of the yoke 44 is inserted into the annular groove portion 51 of the hub 43. Thereafter, the adhesive agent 71 is cured to thereby fix the yoke 44 to the first side surface 61 and the ceiling surface 65 of the hub 43.

In Step S4, the yoke 44 is arranged within the hub 43 so that the radial distance d1 and the axial distance h1 can become smaller than the radial distance d2. d1 signifies the distance between the inner circumferential surface of the upper portion 44a of the yoke 44 and the first side surface 61 of the hub 43. h1 denotes the distance between the upper surface of the yoke 44 and the ceiling surface 65 of the hub 43. d2 indicates the distance between the outer circumferential surface of the upper portion 44a of the yoke 44 and the second side surface 62 of the hub 43. With this configuration, the capillary forces acting between the inner circumferential surface of the upper portion 44a of the yoke 44 and the first side surface 61 of the hub 43 and between the upper surface of the yoke 44 and the ceiling surface 65 of the hub 43 become greater than the capillary force acting between the outer circumferential surface of the upper portion 44a of the yoke 44 and the second side surface 62 of the hub 43. Thanks to this feature, the adhesive agent 71 in an uncured state is readily held between the inner circumferential surface of the upper portion 44a of the yoke 44 and the first side surface 61 of the hub 43 and between the upper surface of the yoke 44 and the ceiling surface 65 of the hub 43. Consequently, the yoke 44 is securely fixed to the first side surface 61 and the ceiling surface 65 of the hub 43.

Due to the capillary phenomenon, the adhesive agent 71 in an uncured state is hard to flow into the gap between the outer circumferential surface of the upper portion 44a of the yoke 44 and the second side surface 62 of the hub 43. This makes it possible to maintain the accuracy of the cylinder portion 43b, thereby suppressing distortion of the cylinder portion 43b.

In particular, the hub 43 of the present preferred embodiment is preferably made of aluminum alloy. This means that distortion may easily occur in the hub 43 as compared with the case where the hub 43 would be made of stainless steel with increased rigidity. Moreover, restriction is imposed on the radial thickness of the cylinder portion 43b because the cylinder portion 43b, the yoke 44 and the rotor magnet 45 radially overlap with one another. Despite such structural disadvantages, the present invention has successfully suppressed distortion of the hub 43, which has exceptionally high technical significance.

As the adhesive agent 71, use is made of a thermosetting resin such as an acrylic resin, an epoxy resin or the mixture thereof. However, the adhesive agent 71 need not necessarily be a thermosetting resin.

While the illustrative embodiments of the present invention have been described hereinabove, the present invention shall not be limited thereto.

The inner circumferential surface of the upper portion 44a of the yoke 44 and the first side surface 61 of the hub 43 may be kept in contact with each other. Likewise, the upper surface of the yoke 44 and the ceiling surface 65 of the hub 43 may remain in contact with each other. It will suffice that the adhesive agent 71 is at least partially interposed between the inner circumferential surface of the upper portion 44a of the yoke 44 and the first side surface 61 of the hub 43 and between the upper surface of the yoke 44 and the ceiling surface 65 of the hub 43.

The axial length of the second side surface 62 of the hub 43 may be shorter than the axial distance of the first side surface 61. In other words, the lower end of the second side surface 62 may be positioned at an elevation higher than the lower end of the first side surface 61.

The hub 43 may not be provided with the annular jut portion 52. For example, the portion of the lower surface of the hub 43 lying radially inwards of the annular groove portion 51 may have a planar shape. The annular jut portion 52 may not be formed into the annular shape. Alternatively, a plurality of juts may be circumferentially arranged in a spaced-apart relationship.

The hub 43 and the bushing 42 may be formed of a single member. For example, the hub 43 and the bushing 42 may be made from a single stainless steel member. The disks 12 may be made of other materials such as glass and the like.

The rotor magnet 45 as a magnetic member may be directly fixed to the first side surface 61 and the ceiling surface 65 of the hub 43 by the adhesive agent 71. In other words, the yoke 44 may not be arranged radially outwards of the rotor magnet 45. It will suffice that either the yoke 44 or the rotor magnet 45 is fixed to the first side surface 61 and the ceiling surface 65 of the hub 43 by the adhesive agent 71.

The present invention may find its application in a spindle motor for rotating disks other than the magnetic disks, e.g., optical disks, and a disk drive apparatus provided with the spindle motor.

The motor according to the present invention can be used in various kinds of recording disk drive apparatuses for performing a reading or writing task of information with respect to a recording disk or various kinds of other devices such as a laser printer and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A spindle motor comprising:
    a stationary unit; and
    a rotary unit supported for rotation with respect to the stationary unit,
    wherein the rotary unit includes: a hub provided with a circular flat portion extending radially with respect to a vertically-extending center axis and having an upwardly-indented annular groove portion formed on the lower surface thereof and a cylinder portion extending downwards from an outer edge of the circular flat portion; and a substantially cylindrical magnetic member having an upper portion fixed to the annular groove portion by an adhesive agent, the hub including a first side surface opposed to an inner circumferential surface of the upper portion of the magnetic member, a second side surface opposed to an outer circumferential surface of the upper portion of the magnetic member and a ceiling surface arranged to interconnect an upper end of the first side surface and an upper end of the second side surface, the adhesive agent applied in an uncured state during a motor manufacturing process being interposed between the inner circumferential surface of the upper portion of the magnetic member and the first side surface of the hub and between the upper surface of the magnetic member and the ceiling surface of the hub, the radial distance between the inner circumferential surface of th upper portion of the magnetic member and the first side surface of the hub and the axial distance between the upper surface of the magnetic member and the ceiling surface of the hub being smaller than the radial distance between the outer circumferential surface of the upper portion of the magnetic member and the second side surface of the hub, the inner circumferential surface of the cylinder portion including a third side surface positioned below the second side surface and having an inner diameter greater than the inner diameter of the second side surface, the radial distance between the outer circumferential surface of the magnetic member and the third side surface being greater than the radial distance between the outer circumferential surface of the upper portion of the magnetic member and the second side surface.

2. The spindle motor of claim 1, wherein the upper surface of the magnetic member is in contact with the ceiling surface of the hub, the outer circumferential surface of the upper portion of the magnetic member being opposed to the second side surface of the hub with a gap left therebetween.

3. The spindle motor of claim 1, wherein the surface roughness of the third side surface is greater than the surface roughness of the second side surface.

4. The spindle motor of claim 1, wherein the axial length of the second side surface is longer than the axial length of the first side surface.

5. The spindle motor of claim 1, wherein the magnetic member includes a radially outwardly protruding bulge portion formed at the lower end portion thereof, the inner circumferential surface of the cylinder portion further including a fourth side surface positioned below the third side surface and having an inner diameter greater than the inner diameter of the third side surface, the bulge portion having an outer circumferential surface radially opposed to the fourth side surface with a gap left therebetween.

6. The spindle motor of claim 1, wherein the rotary unit further includes a magnet fixed to the inner circumferential surface of the magnetic member.

7. The spindle motor of claim 6, wherein the hub is made of aluminum alloy.

8. A spindle motor comprising:
    a stationary unit; and
    a rotary unit supported for rotation with respect to the stationary unit,
    wherein the rotary unit includes: a hub provided with a circular flat portion extending radially with respect to a vertically-extending center axis and having an upwardly-indented annular groove portion formed on the lower surface thereof and a cylinder portion extending downwards from an outer edge of the circular flat portion; and a substantially cylindrical magnetic member having an upper portion fixed to the annular groove portion by an adhesive agent, the hub including a first side surface opposed to an inner circumferential surface of the upper portion of the magnetic member, a second side surface opposed to an outer circumferential surface of the upper portion of the magnetic member and a ceiling surface arranged to interconnect an upper end of the first side surface and an upper end of the second side surface, the adhesive agent applied in an uncured state during a motor manufacturing process being interposed between the inner circumferential surface of the upper portion of the magnetic member and the first side surface of the hub and between the upper surface of the magnetic member and the ceiling surface of the hub, the radial distance between the inner circumferential surface of the upper portion of the magnetic member and the first side surface of the hub and the axial distance between the upper surface of the magnetic member and the ceiling surface of the hub being smaller than the radial distance between the outer circumferential surface of the upper portion of the magnetic member and the second side surface of the hub, the inner circumferential surface of the cylinder portion including a third side surface positioned below the second side surface and having an inner diameter greater than the inner diameter of the second side surface, the cylinder portion of the hub including a step portion arranged between the second side surface and the third side surface.

9. The spindle motor of claim 8, wherein the upper surface of the magnetic member is in contact with the ceiling surface of the hub, the outer circumferential surface of the upper portion of the magnetic member being opposed to the second side surface of the hub with a gap left therebetween.

10. The spindle motor of claim 8, wherein the surface roughness of the third side surface is greater than the surface roughness of the second side surface.

11. The spindle motor of claim 8, wherein the axial length of the second side surface is longer than the axial length of the first side surface.

12. The spindle motor of claim 8, wherein the magnetic member includes a radially outwardly protruding bulge portion formed at the lower end portion thereof, the inner circumferential surface of the cylinder portion further including a fourth side surface positioned below the third side surface and having an inner diameter greater than the inner diameter of the third side surface, the bulge portion having an outer circumferential surface radially opposed to the fourth side surface with a gap left therebetween.

13. The spindle motor of claim 8, wherein the rotary unit further includes a magnet fixed to the inner circumferential surface of the magnetic member.

14. The spindle motor of claim 13, wherein the hub is made of aluminum alloy.

* * * * *